United States Patent [19]
Kajiura

[11] Patent Number: 4,769,721
[45] Date of Patent: Sep. 6, 1988

[54] STILL PICTURE REPRODUCING APPARATUS

[75] Inventor: Minoru Kajiura, Tokyo, Japan

[73] Assignee: Sony Corporation, Tokyo, Japan

[21] Appl. No.: 72,857

[22] Filed: Jul. 14, 1987

[30] Foreign Application Priority Data

Jul. 25, 1986 [JP] Japan ................................ 61-174904

[51] Int. Cl.⁴ .......................... H04N 5/781; H04N 5/78
[52] U.S. Cl. .................................. 360/10.1; 358/342; 360/14.1; 369/47
[58] Field of Search ..................... 360/10.1, 10.2, 10.3, 360/11.1, 14.1, 75, 77, 78, 35.1; 358/312, 335, 342; 369/47

[56] References Cited

U.S. PATENT DOCUMENTS

| 4,423,497 | 12/1983 | Sugiyama et al. | 358/342 X |
| 4,626,930 | 12/1986 | Sugiyama | 358/342 |
| 4,717,968 | 1/1988 | Painton et al. | 360/10.1 X |

Primary Examiner—Marvin L. Nussbaum
Attorney, Agent, or Firm—Philip M. Shaw, Jr.

[57] ABSTRACT

A still image reproduction apparatus wherein still images recorded on tracks on a disk are visually reproduced for a predetermined minimum time interval in response to the direction and amount of rotation of an operator adjustable dial so that the operator can visually identify the still image displayed on the monitor when the operator dials quick switching of the still images in a sequential reproduction mode.

8 Claims, 7 Drawing Sheets

STILL PICTURE REPRODUCING APPARATUS

BACKGROUND OF THE INVENTION

1. Field of the Invention

The present invention relates to a still image reproduction apparatus and, more particularly, to an apparatus for reproducing a still image recorded on a disk.

2. Description of the Prior Art

In conventional electronic equipment such as a still picture, video disk reproduction apparatus and its editing apparatus, a desk top input device for allowing an operator to designate a mode is arranged separately from the equipment body. The operator depresses, e.g., an up or down switch arranged on an operation panel of the operation input device or with keys enters a track number of a recording track for a desired still image. Thereafter, a still image signal recorded in the designated recording track on the video disk is reproduced or edited.

In the electronic equipment of the type described above, if the operator can designate an operation mode for successively switching a plurality of still images at a desired timing and successively displaying the still images (this mode is referred to as a successive reproduction mode), the operator can conveniently and successively watch the images for reproduction or editing as if the operator is turning the pages of a book.

In practice, the successive reproduction mode can be utilized in the following cases. First, after one still image is watched for a long period of time, this still image is then switched to another still image. Alternatively, the still images are initially switched at short intervals of time and the switching rate is gradually decreased to search for a desired still image.

If the operator can selectively change the image switching rate, the number of images subjected to switching can be roughly counted, thus providing a convenient operation input device.

Such an operation element is exemplified by a jog dial as a rotary operation element for controlling the feed rate of the images by the rotational speed of the dial in a conventional video tape recorder or the like. This conventional rotary operation element may be used in a still video reproduction apparatus.

However, when the images are switched at high speed, the display time per image is shortened and the next image is displayed before the operator identifies the previous still image.

Unlike movie images, two adjacent still images do not often have any correlation between them. In this case, it is very difficult for the operator to visually recognize each still image within a very short display time.

OBJECTS AND SUMMARY OF THE INVENTION

The present invention has been made in consideration of the above situation, and has as its object to provide a still image reproduction apparatus wherein still images can be switched according to an operator selectible display time so that the operator can visually recognize the displayed still images in spite of frequent switching of the still images.

In a still image reproduction apparatus according to the present invention, a still image of a first predetermined recording track is displayed for a period exceeding a predetermined time interval and then a still image from a second predetermined recording track spaced apart from the first recording track by a number of recording tracks corresponding to the physical position of an operator controlled input dial is displayed. Therefore, even if the still images are switched and displayed at high speed in a successive reproduction mode, an operator can visually identify the still images.

In order to solve the above problem according to the present invention, there is provided an apparatus having a reproduction head and display means for visually reproducing still images recorded in separate tracks on a disk which are scanned by the reproduction head, the apparatus being characterized by dial means, including an operator controllable dial, for generating pulse signals on the basis of the direction and amount of movement of the dial; a track data generating circuit, responsive to the pulse signals, for sequentially updating a track number of a recording track on which a still image is recorded and for generating track data representing the track number; and head drive and control means for stepping the reproduction head to a recording track indicated by said track number when a predetermined time interval has elapsed after said reproduction head was last moved, said track number being incremented by said pulse signals generated during the time interval required for the last movement of said reproduction head plus said pulse signals generated during said predetermined time interval; wherein the still image of the predetermined recording track is displayed for a period exceeding the predetermined time interval and then a still image from a next recording track spaced apart therefrom by a number of recording tracks corresponding to a rotational amount of the rotary dial is displayed.

After a still image of a predetermined recording track is displayed for a period exceeding a predetermined time interval, the recording tracks are skipped by a number corresponding to the amount of movement of the dial to display the still image of the next recording track. Even if the dial is moved at a high speed, the operator can visually identify the still image of the recording track for a period exceeding the minimum time interval. As a result, the operator can visually and easily recognize the contents of the still image.

These and other objects, features and advantages of the present invention will become apparent from the following detailed description of the preferred embodiment which is to be read in conjunction with the accompanying drawings.

DESCRIPTION OF THE PREFERRED EMBODIMENT

An embodiment of the present invention will be described in detail with reference to the accompanying drawings.

Figure 1:
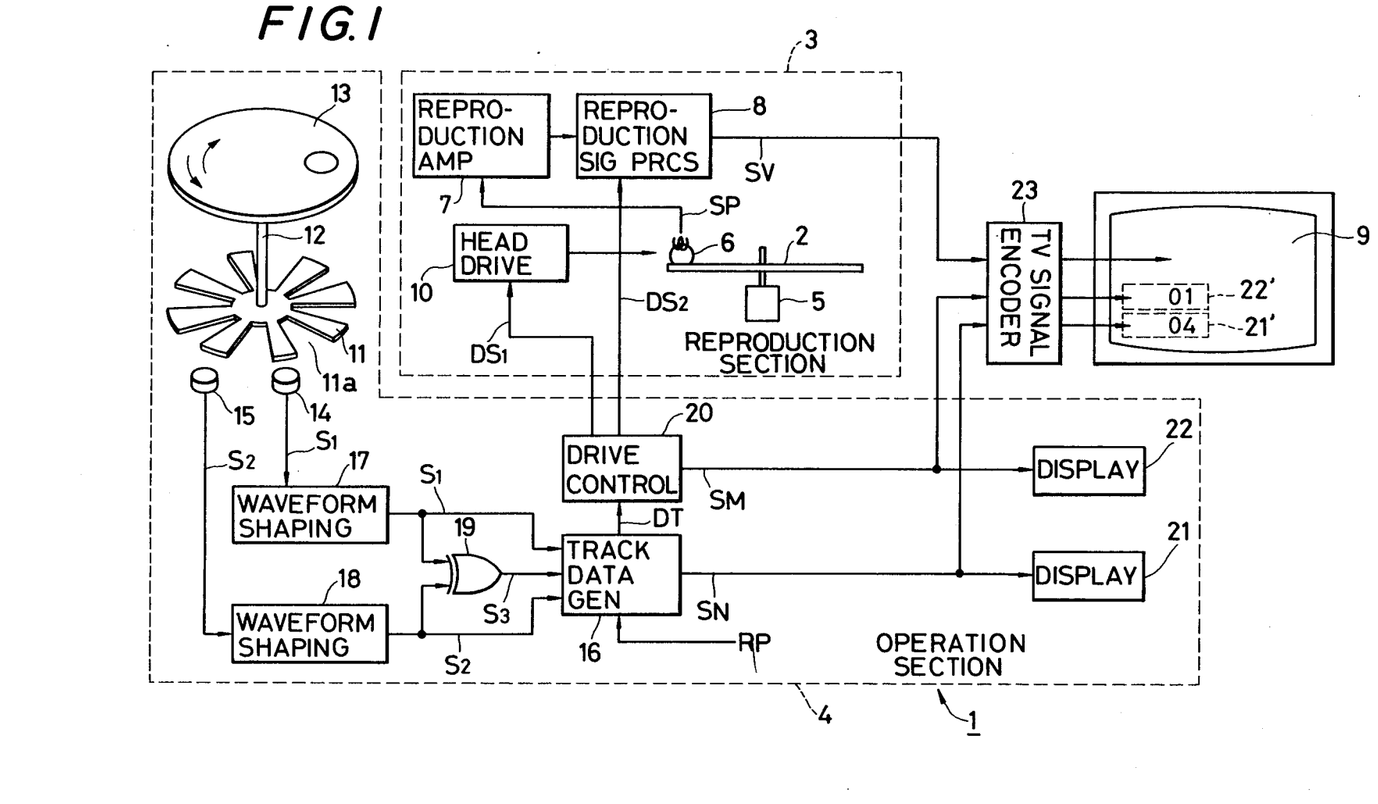
FIG. 1 is a block diagram showing an embodiment of a still video reproduction apparatus according to the present invention.

Referring to FIG. 1, reference numeral 1 denotes a still video reproduction apparatus using a magnetic disk 2. The still video reproduction apparatus 1 comprises a reproduction device 3 and an operation input device 4.

In the reproduction device 3, a reproduction output signal SP obtained through a magnetic head 6 is received by a reproduction output means constituted by a reproduction amplifier 7, a reproduction signal processor 8, and a monitor 9, while the magnetic disk 2 is rotated by a motor 5.

The reproduction signal processor 8 receives the reproduction output signal SP through the reproduction amplifier 7 and selectively causes the monitor 9 to display one at a time, e.g., 50 still images recorded on 50 recording tracks on the magnetic disk 2. The output signal SP is supplied through a TV signal encoder 23 to the monitor 9.

A head drive circuit 10 cooperates with a system drive controller 20 including a microcomputer and included in the operation input device 4 to constitute a drive control means for the magnetic head 6. The drive control means shifts the position of the magnetic head 6 in response to a control signal DS1 output from the operation input device 4, thereby obtaining a reproduction output signal SP from a desired recording track.

When a control signal DS2 output from the operation input device 4 is set at logic "L", the reproduction signal processor 8, which includes a muting circuit interrupts processing of the reproduction output signal SP supplied from the magnetic head 6. As a result, the display on the monitor 9 is interrupted.

A disk-like code plate 11 having slits 11a in its edge and a rotary dial 13 are mounted in common on a rotating shaft 12 which is rotatably mounted with respect to an operation panel (not shown) in the operation input device 4 so that the dial 13 is accessible to the user to rotate the code plate 11.

The rotational torque resistance of the rotary dial 13 is changed by a detent mechanism (not shown) depending on the angular position thereof. That is, when the rotary dial 13 is rotated by one revolution, the operator will feel a click corresponding to each of the slits 11a of the code plate 11.

Figure 2:
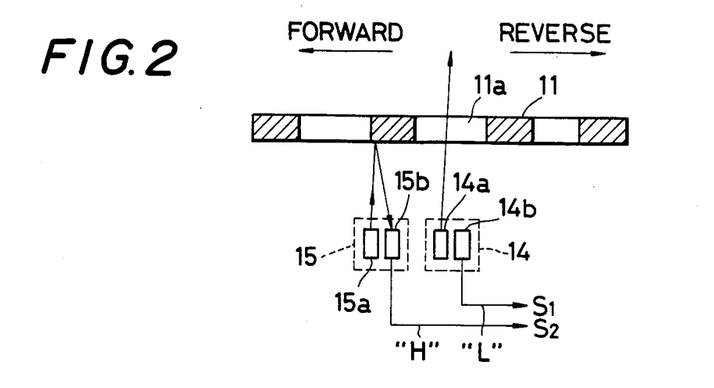
FIG. 2 is a sectional view showing a positional relationship between the code plate and the photointerrupters.

Angular position detection elements, e.g., photointerrupters 14 and 15 are arranged below the code plate 11 to detect the angular position of the code plate 11. As shown in FIG. 2, the photointerrupters 14 and 15 comprise light-emitting elements 14a and 15a and light-receiving elements 14b and 15b for detecting beams reflected by the code plate 11 and are aligned along the circumferential direction of the code plate 11.

The logic levels of signals S1 and S2 output from the photointerrupters 14 and 15 are changed depending on the rotational direction and the rotational speed of the code plate 11. When slits 11a are located above the photointerrupters 14 and 15, their output signals are set at logic "L", otherwise they are set at logic "H."

The signals S1 and S2 are supplied to separate wave shapers 17 and 18, respectively. A track data generator 16 receives the signals S1 and S2 from the wave shapers 17 and 18 and an EX-OR output signal S3 generated from the input signals S1 and S2 by an exclusive OR gate 19.

The track data generator 16 determines on the basis of the input signals S1 to S3 whether the rotary dial 13 is rotated clockwise (to be referred to as a forward direction hereinafter) or counterclockwise (to be referred to as a reverse direction hereinafter) and generates track data DT representing a track number on the basis of both the direction of rotation and the rotational angle of the rotary dial 13. The track data DT is supplied to a drive controller circuit 20.

Figure 3A:
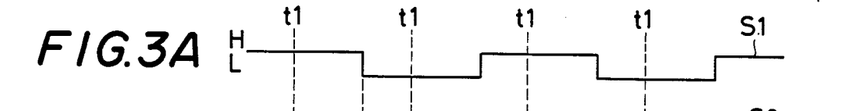
FIGS. 3A-3C and 4A-4C are timing charts for explaining the operation of the still video reproduction apparatus shown in FIG. 1.
Figure 3B:
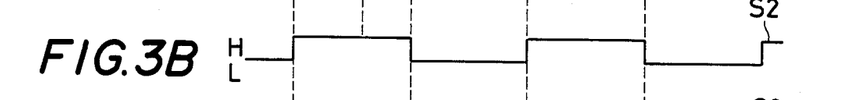
Figure 3C:
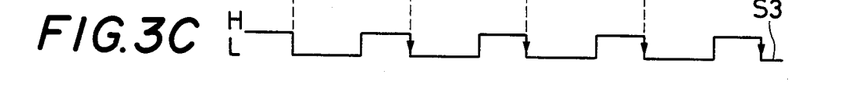

When the rotary dial 13 is rotated in the forward direction, as shown in FIGS. 3A to 3C, the input signal S1 from the photointerrupter 14 is set first at logic "H" (FIG. 3A) and then the input signal S2 is set at logic "H" (FIG. 3B). At the fall time t1 (FIG. 3C) of the input signal S3, the input signal S2 goes from logic "L" to logic "H" or vice versa.

Figures 4A, 4B:
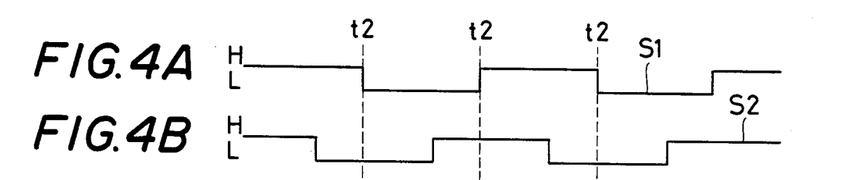
Figure 4C:
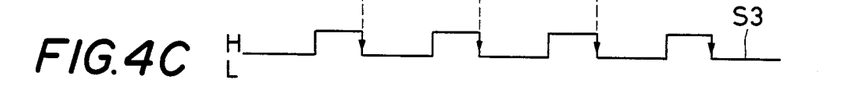

When the rotary dial 13 is rotated in the reverse direction, as shown in FIGS. 4A to 4C, the input signal S2 is set first at logic "H" (FIG. 4B) and then the input signal S1 is set at logic "H" (FIG. 4A). At the fall time (FIG. 4C) of the input signal S3, the input signal S1 goes from logic "L" to logic "H" or vice versa.

Figure 5:
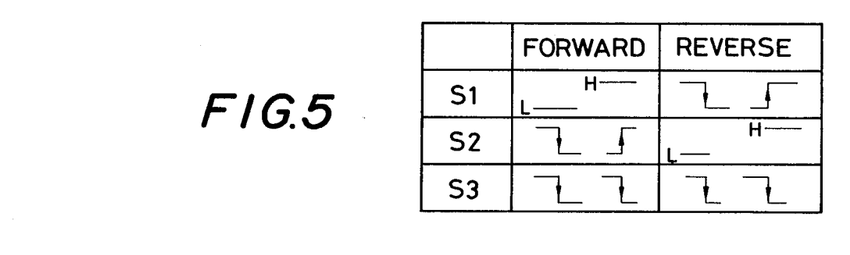
FIG. 5 is a table for explaining the operation of the still video reproduction apparatus shown in FIG. 1.

As shown in FIG. 5, the change points of the input signals S1 and S2 at the fall times t1 and t2 of the input signal S3 can be detected to indicate the rotational direction of the rotary dial 13.

At the fall time, i.e., logic "L" of the input signal S3, the track data generator 16 updates the track number (absolute address) by subtracting or adding "1," depending upon the rotational direction of the rotary dial 13, to the number of the recording track which is scanned with the magnetic head 6.

At the same time, the track data generator 16 sends a signal SN to a display 21 to display the track data DT represented by an output signal SN. It should be noted that the head 6 is set at the outermost track (track No. 0) upon insertion of the magnetic disk 2 into the reproduction device 3, and that at the same time a reset pulse RP is input to the track data generator 16 to reset a track number counter to zero.

Using the rotary dial 13 as the operation input element and the pulse signals S1, S2, and S3 obtained from the rotary operation element through the rotational amount detector comprising the exclusive OR gate 19, the wave shapers 17 and 18, and the photointerrupters 14 and 15, the track data generator 16 generates the track data DT which is then displayed on the operation panel.

Figure 6:
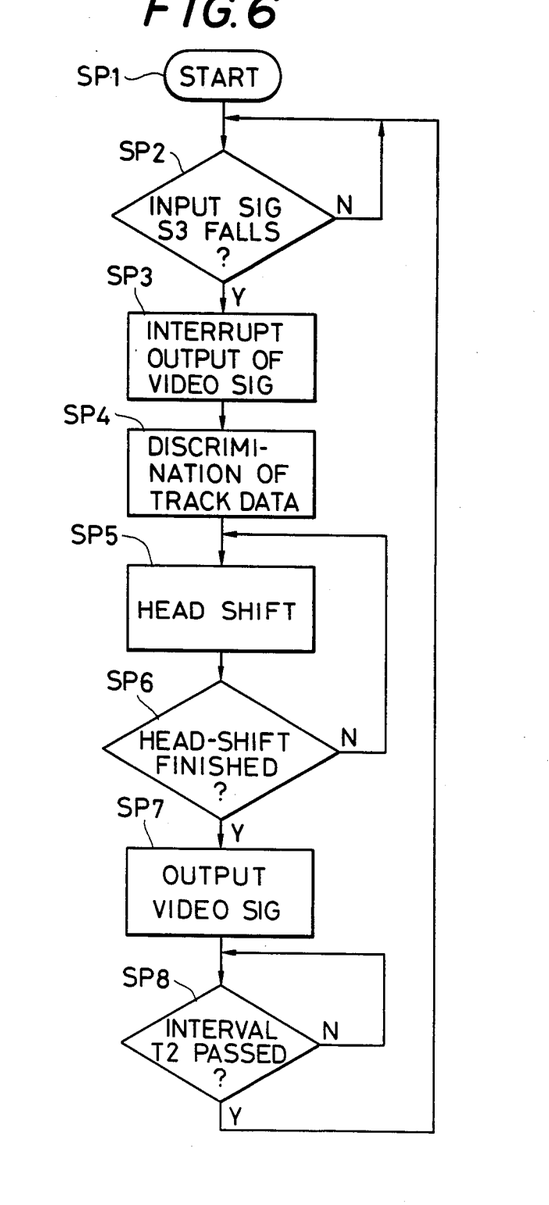
FIG. 6 is a flow chart for explaining the operation of the still video reproduction apparatus shown in FIG. 1.
Figure 7A:
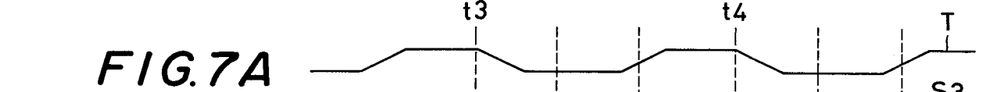
FIGS. 7A-7E, 8A-8E, and 9A-9E are timing charts for explaining the operation according to the rotational speed of the rotary dial.
Figure 7B:
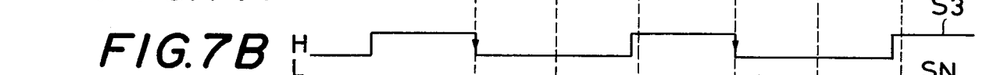
Figure 7C:
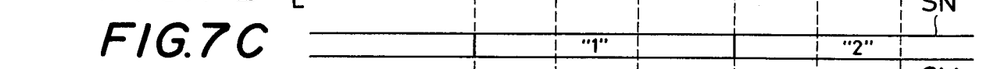
Figure 7D:
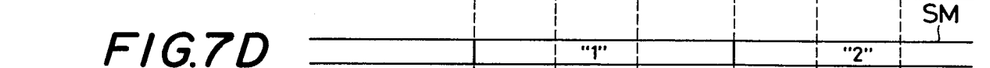
Figure 7E:
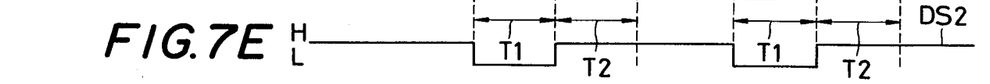

The drive controller 20 comprises a microcomputer including a CPU (Central Processing Unit) and executes a program shown in FIG. 6. The CPU starts in step SP1 and determines in step SP2 whether the input signal S3 is falling. If the answer is NO in step SP2, the operation in step SP2 is repeated.

However, if the input signal S3 falls and the track data DT is input, the CPU so determines the answer to be YES in step SP2. The CPU advances to step SP3. The control signal DS2 goes to logic "L" to prevent a disturbed image from being displayed on the monitor 9 while the magnetic head 6 is shifted to a predetermined recording track.

The CPU then determines a track number represented by the track data DT in step SP4. The track number is displayed on the display 21 in the operation panel.

In step SP5, the control signal DS1 is output to move the magnetic head 6 to a recording track whose track number is determined in step SP4. The CPU advances to step SP6, and the CPU determines whether shifting of the magnetic head 6 has finished.

If the answer is NO in step SP6, the CPU returns to step SP5. The loop of steps SP5, SP6, and SP5 is repeated. When the magnetic head 6 is determined to have been completely shifted, the CPU so determines the answer to be YES in step SP6. The CPU advances to step SP7.

In step SP7, the drive controller 20 enables the control signal DS2 as logic "H". A still image recorded on the recording track whose track number is represented by the track data DT is displayed on the monitor 9 on the basis of the reproduction output signal SP supplied from the magnetic head 6 which has been already stopped.

Subsequently, a display interval of the still image displayed on the monitor 9 is counted in step SP8. The CPU then determines whether the display interval has passed a predetermined interval T2. The interval T2 is determined to be, e.g., 0.2 (sec), which allows the operator to visually recognize the still image. Even if the still images are changed frequently, this period of time allows the operator to visually recognize the still images.

However, if the answer is NO in step SP8, the operation in step SP8 is repeated. If the display interval reaches the predetermined interval T2, the CPU so determines the answer to be YES in step SP8. The CPU returns to step SP2, and the CPU waits for detection of the fall time of the input signal S3.

The drive controller 20 neglects the track data DT output from the track data generator 16 and executes the program shown in FIG. 6 for the interval T2 for displaying the still image after the input signal S3 falls and the magnetic head 6 starts moving.

The track data generator 16 sends track data DT representing the rotational direction of the rotary dial 13 every time the input signal S3 falls regardless of whether the drive controller 20 fetches the track data DT or not. At the same time, the track data generator 16 updates the track number displayed on the display 21.

As shown in FIG. 7, when the rotary dial 13 is slowly turned to cause the input signal S3 to fall after the magnetic head 6 is completely moved within the interval T1 and the predetermined time interval T2 has elapsed, the drive controller 20 sets the control signal DS2 (FIG. 7E) to be logic "L" at a fall time t3 (FIG. 7B) of the input signal S3 at which the logic level is changed in synchronism with a change in the rotational torque T (FIG. 7A) of the rotary dial 13. Display of the monitor 9 is interrupted, and the drive controller 20 waits for the magnetic head 6 to move. In this case, the signal SN and the signal SM (FIGS. 7C and 7D) which are supplied to the displays 21 and 22 represent the track number (e.g., "1") of the destination recording track.

When the shift of the magnetic head 6 is completed, the control signal DS2 goes to logic "H". As a result, the still image recorded in the recording track represented by the track data DT is displayed on the monitor 9. When the display time reaches the interval T2, the drive controller 20 returns to step SP2. At the fall time t4 of the next input signal S3, the drive controller 20 moves the magnetic head 6 to the recording track of the next track number (e.g., "2").

Every time the input signal S3 falls upon operation of the rotary dial 13, the still image in the recording track having the track number displayed on the display 21 is displayed on the monitor 9. At the same time, the track number of this recording track is displayed on the display 22 or in the display area 22' in the monitor 9 by the output signal SM of the drive controller 20.

The number of clicks of the dial 13, i.e., the number of detected slits or the track number of the recording track to which the head does not access, is displayed on the display 21. The track number of the currently reproduced still image is displayed on the display 22.

When the operator quickly turns the rotary dial 13 to move the magnetic head 6, as shown in FIG. 8, so that the input signal S3 falls again during the interval T2 (FIGS. 8A and 8B), and the drive controller 20 outputs the control signal DS2 at the first rise time t5 (FIG. 8E) of the input signal S3, the controller 20 causes the magnetic head 6 to start moving. In this case, the track number "1" represented by the signals SN and SM (FIGS. 8C and 8D) is displayed on the displays 21 and 22.

When the magnetic head 6 is completely moved, the system controller 20 enables the control signal DS2. In step SP8, the drive controller 20 starts counting the display time.

Meanwhile, the input signal S3 goes to logic "L" at time t6. Even if the track data DT is output, the drive controller 20 neglects this track data DT and continues to count the display time.

Figure 8A:
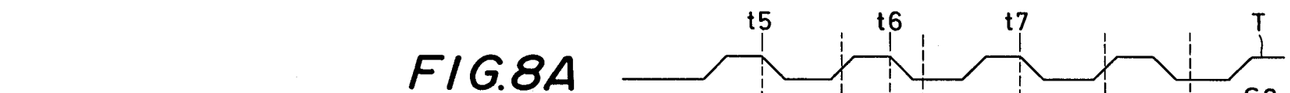
Figure 8B:
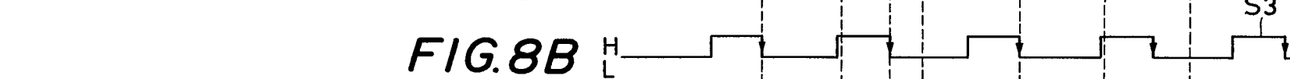
Figure 8C:
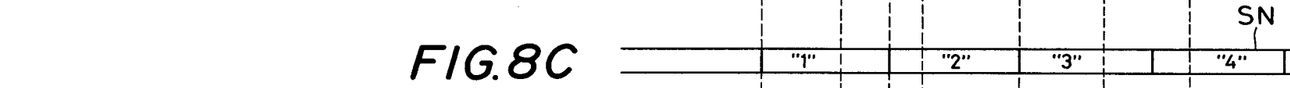
Figure 8D:
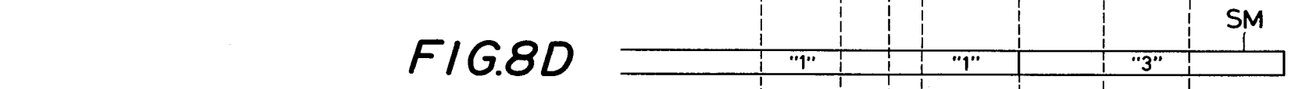
Figure 8E:
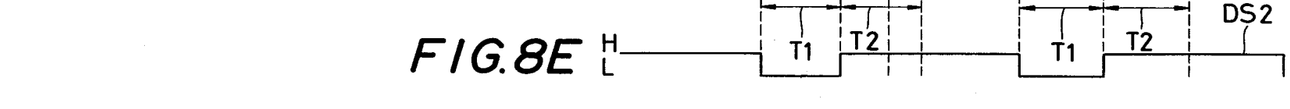

The track number represented by the signal SN and displayed on the display 21 is updated to the next track number "2". However, the track number "1" of the still image displayed on the monitor is continuously displayed on the display 22 by the content represented by the signal SM (FIGS. 8C and 8D).

When the display time reaches the interval T2, the drive controller 20 returns to step SP2 and waits for the trailing edge of the input signal S3.

At the next fall time t7 of the input signal S3, the corresponding track data DT represents the track number "3". The drive controller 20 moves the magnetic head 6 to the recording track with the track number "1" to the recording track with the track number "3" (in this case, the track numbers represented by the signals SN and SM and displayed on the displays 21 and 22 are updated to the track number "3").

Even if the operator turns the rotary dial 13 at a speed corresponding to the timing of the fall of the input signal S3 so as to change the currently displayed still image into the next still image before he sufficiently identifies the contents of the currently displayed still image, the currently displayed still image can be displayed for the display time T2 to allow him to visually identify the contents thereof. Every other still image is sequentially displayed.

As shown in FIG. 9 (in this case, the time base is longer than that in FIGS. 7 and 8 for illustrative convenience), when the operator turns the rotary dial 13 at a high speed for causing the input signal S3 to fall before the magnetic head 6 is completely moved (FIGS. 9A and 9B), the drive controller 20 moves the magnetic head 6 to the recording track with the track number "1" at the first fall time t8 of the input signal S3. Therefore, the track number "1" is displayed on the displays 21 and 22 (FIGS. 9C, 9D, and 9E).

Even if the input signal S3 rises at the next time t9, the drive controller 20 repeats the loop of steps SP5, SP6, and SP5. In this case, the driver controller 20 neglects the track data DT (this data represents the track number "2") output from the track data generator 16.

Figure 9A:
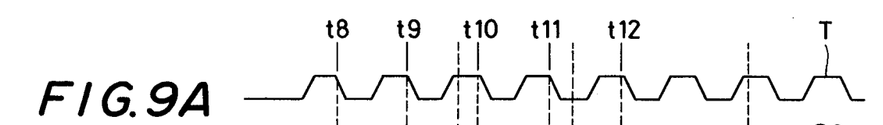
Figure 9B:
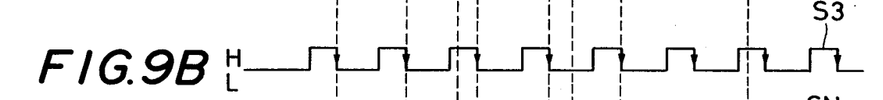
Figure 9C:
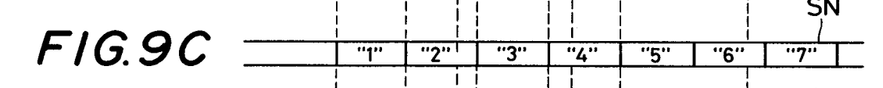
Figure 9D:
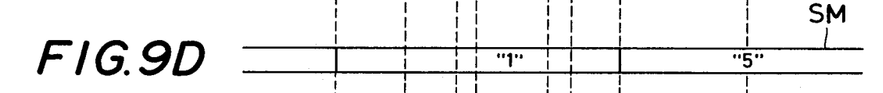
Figure 9E:
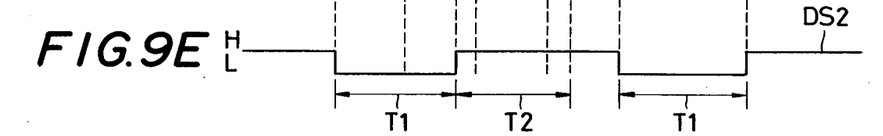

The content of the display 21 which is represented by the signal SN is updated to the currently updated track number "2" (FIG. 9C).

Even if the input signal S3 falls at times t10 and t11, the drive controller 20 does not return to SP2 (i.e., the display time does not reach the interval T2). Therefore, the drive controller 20 continuously neglects track data DT, representing the track numbers "3" and "4", which is output from the track data generator 16.

When the display time reaches the interval T2 and then the input signal S3 falls at time t12, the drive controller 20 fetches the track data DT, representing the track number "5", which is output from the track data generator 16. The still image recorded in the track having the track number "5" is then displayed.

Even if the operator turns the rotary dial 13 very quickly, each still image can be displayed for a period exceeding the interval T2 to allow the operator to visually identify the content thereof. Therefore, still images can be changed according to the rotational operation of the rotary dial 13 (in this case, every five still images).

With the above arrangement, when the operator slowly turns the rotary dial 13, the still images can be observed on the monitor 9 one by one at the timings designated by rotation of the rotary dial 13.

When the operator turns the rotary dial 13 at a speed for causing the input signal S3 to fall at a timing so as not to allow the operator to visually identify the contents of the still image, the currently displayed still image is displayed for a period exceeding the interval T2 for allowing the operator to visually identify the currently displayed still image. Thereafter, the recording tracks are skipped by a number corresponding to the rotational operation of the rotary dial 13.

Figure 10:
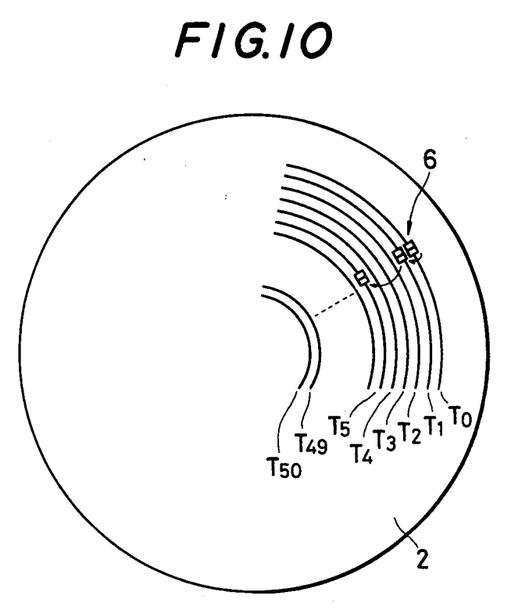
FIG. 10 shows a format of the video disk.

FIG. 10 illustrates the movement of the magnetic head 16 during a high-speed operation shown in FIG. 9. Although the disk 2 is inserted in the reproduction device 3 and is located at the position corresponding to a track T0, the magnetic head 6 reproduces the still image in a track T1, then skips over the still images in tracks T1 to T4, and reproduces the still image in the track T5.

With the above arrangement, even if the operator turns the rotary dial 13 at a high speed, the currently displayed still image is continuously displayed for a period exceeding the interval T2 for allowing the operator to visually identify its contents. Thereafter, the still images corresponding to the operation amount of the rotary dial 13 are skipped, and the next still image is displayed. Therefore, there is provided a still video reproduction apparatus wherein even if the operator quickly turns the dial, the operator can visually identify the contents of each still image displayed on the monitor.

In the above embodiment, the interval T2 for allowing the operator to visually identify the contents of the still image is given as 0.2 sec. However, the interval may be arbitrarily changed.

Even if continuous still images represent a sequence of motion, the operator can visually identify them although they are sequentially quickly changed. However, if the contents of the still image represent complicated shapes or the like, it takes a longer period of time for the operator to visually recognize them. In other words, a longer display interval T2 is required. By taking this case into consideration, the interval T2 may be variable.

In the above embodiment, the display operation of the monitor 9 is interrupted for the interval T1 required for moving the magnetic head 6 so as to prevent the disturbed image from being displayed thereon. However, instead, the still image prior to the movement of the magnetic head 6 may be displayed for the interval T1 by using, e.g., a field memory.

In the above embodiment, the currently displayed still image is changed into the next still image in accordance with the track data DT output upon a lapse of the time interval T2. However, the present invention is not limited to this. The currently displayed still image may be changed into the next still image in the recording track having a track number represented by the track data DT generated just before the lapse of the interval T2 as soon as the interval T2 has elapsed.

In the above embodiment, the photointerrupters are used to detect angular position information of the code plate by light reflected by the code plate. However, an input means for entering the rotational amount is not limited to this, but may be variously modified. For example, the rotary dial could be replaced by a slide type dial coupled to suitable transducers to produce the output signals S1 and S2.

In the above embodiment, the present invention is applied to a still video reproduction apparatus having separate reproduction and operation input devices. However, the present invention is not limited to this. The present invention may be applied to a still video reproduction apparatus having integral reproduction and operation input devices.

In the above embodiment, the present invention is applied to the still video reproduction apparatus using a magnetic disk. However, the present invention is not limited to this but may be applied to a optical still video reproduction apparatus for reproducing a still image on the basis of a reproduced signal by an optical reproduction head by using, e.g., an optical disk or by a video tape recorder.

According to the present invention as described above, there is easily provided a still image reproduction apparatus wherein still images are changed according to an operation amount and the operator can visually identify the still image displayed on the monitor when the operator instructs quick switching of the still images in a sequential reproduction mode.

The above description is given on a single preferred embodiment of the invention but it will be apparent that many modifications and variations could be effected by one skilled in the art without departing from the spirit or scope of the novel concepts of the invention, so that the scope of the invention should be determined by the appended claims only.

I claim as my invention:

1. Apparatus having a reproduction head and display means for visually reproducing still images recorded in separate tracks on a disk which are scanned by the reproduction head, wherein the apparatus is comprised of dial means, including an operator controllable dial, for generating pulse signals on the basis of the direction and amount of movement of the dial;
a track data generating circuit, responsive to the pulse signals, for sequentially updating a track number of a recording track on which a still image is recorded and for generating track data representing the track number; and head drive and control means for stepping the reproduction head to a recording track indicated by said track number when a predetermined time interval has elapsed after said reproduction head was last moved, said track number being incremented by said pulse signals generated during a time interval required for the last movement of said reproduction head plus said pulse signals generated during said predetermined time interval;

wherein the still image of the predetermined recording track is displayed for a period exceeding the predetermined time interval and then a still image from a next recording track spaced apart therefrom by a number of recording tracks corresponding to a rotational amount of the rotary dial is displayed.

2. A still image reproduction apparatus for visually reproducing still images recorded in tracks on a medium, wherein the apparatus comprises:

user operable control means having a jog dial for generating pulse signals on the basis of the direction and the amount of change of the position of said dial;

a track data generating circuit, responsive to the pulse signals, for sequentially updating a track number of a recording track on which a still image is recorded and for generating track data representing the track number;

control signal generating means for generating a head shift pulse by processing said track data and outputting said head shift pulse with a timing such that the time interval required for track access of said reproduction head and a predetermined time interval required for the operator to visually recognize a reproduced picture are both exceeded;

head drive means for step-by-step moving of said reproduction head to a recording track in response to said head shift pulse reproduction output means for reproducing and outputting the still image from the recording track scanned with said reproduction head on the basis of an output signal from said reproduction head; and wherein the still image of the predetermined recording track is visually displayed for a period exceeding the predetermined time interval and then a still image from a next recording track spaced apart therefrom by a number of recording tracks corresponding to a rotational amount of said rotary dial is visually displayed.

3. A still image reproduction apparatus according to claim 2, characterized in that said reproduction output means includes a muting circuit for muting said output signal during the head access interval in response to a muting control signal; and said control signal generating means further generates said muting control signal as a function of said track data and the access time interval.

4. A still image reproduction apparatus according to claim 2 further including a visual display of the track number of the still image being reproduced.

5. A still image reproduction apparatus according to claim 2 further including a visual display of the track number of the still image to be reproduced as selected by the operator using the jog dial.

6. A still image reproduction apparatus according to claims 5 or 6 further comprising a TV monitor having a screen for displaying the reproduced still image and wherein said track number display is superimposed on the monitor screen.

7. A still image reproduction apparatus according to claims 1 or 2 wherein said dial is a rotary dial and wherein the phasing of said pulses is indicative of the direction of rotation of said dial and the number of said pulses is indicative of the amount of rotation of said dial.

8. A still image reproduction apparatus according to claim 7 wherein said dial includes detent means for imparting a physical resistance to the rotation of the dial in increments corresponding to the separate tracks.

* * * * *